United States Patent [19]

Sharp

[11] Patent Number: 5,569,848

[45] Date of Patent: Oct. 29, 1996

[54] SYSTEM, METHOD AND APPARATUS FOR MONITORING TIRE INFLATION PRESSURE IN A VEHICLE TIRE AND WHEEL ASSEMBLY

[76] Inventor: Everett H. Sharp, 344 E. Maryknoll Rd., Rochester Hills, Mich. 48309

[21] Appl. No.: 369,661

[22] Filed: Jan. 6, 1995

[51] Int. Cl.$^6$ .............................. B60C 23/06; G01P 3/00
[52] U.S. Cl. ............................ 73/146.2; 73/146; 73/490; 73/507; 73/509; 340/441; 340/444; 364/424.03; 364/424.04; 364/558; 364/565; 364/571.07; 324/160; 324/161
[58] Field of Search ........................... 152/415; 340/444, 340/441, 671; 73/146.4, 146.5, 488, 490, 495, 497, 499, 509, 146.2, 146, 507; 324/160, 161; 364/424.01, 424.03, 424.04, 558, 565, 571.07, 571.01

[56] References Cited

U.S. PATENT DOCUMENTS

| | | | |
|---|---|---|---|
| 3,581,277 | 5/1971 | Beatty et al. | 340/444 |
| 3,613,075 | 10/1971 | Griffiths et al. | 340/444 |
| 3,691,524 | 9/1972 | Frost et al. | 340/444 |
| 4,167,699 | 9/1979 | Baker | 324/171 |
| 4,355,298 | 10/1982 | Jessup | 73/146.2 X |
| 4,414,548 | 11/1983 | Carpenter et al. | 340/441 X |
| 4,777,611 | 10/1988 | Tashiro et al. | 364/565 |
| 4,803,646 | 2/1989 | Burke et al. | 364/565 |
| 4,876,528 | 10/1989 | Walker et al. | 340/442 |
| 5,192,929 | 3/1993 | Walker et al. | 340/444 |
| 5,218,862 | 6/1993 | Hurrell, II et al. | 340/444 X |
| 5,228,337 | 7/1993 | Sharpe et al. | 73/146.5 |
| 5,231,597 | 7/1993 | Komatsu | 364/561 |
| 5,307,293 | 4/1994 | Sakai | 364/565 |
| 5,343,741 | 9/1994 | Nishihara et al. | 340/444 X |
| 5,345,217 | 9/1994 | Prottey | 340/444 X |
| 5,442,331 | 8/1995 | Kishimoto et al. | 340/444 |

FOREIGN PATENT DOCUMENTS 2246461   1/1992   United Kingdom.

OTHER PUBLICATIONS

Brooke, et al., "Supercar Technology Now!," *Automotive Industries*, Dec. 1993, pp. 25–30.
"Global Viewpoint," *Automotive Engineering*, Oct. 1994, p. 68.

Primary Examiner—Michael W. Ball
Assistant Examiner—Francis J. Lorin
Attorney, Agent, or Firm—Barnes, Kisselle, Raisch, Choate, Whittemore & Hulbert

[57] ABSTRACT

A system, method and apparatus for use on vehicles having road wheels with pneumatic tires that includes sensors that produce signals that are a measure of the rotational speed of said wheels, indicators arranged to provide information to the driver of the vehicle, and a computer operably associated with said sensors and indicators. The computer is arranged to monitor the wheel speed sensors during vehicle operation, and to perform at least one of the functions of: determining a value that represents tire inflation pressure and signaling the driver when this value falls below a predetermined value, determining a value that represents tire inflation pressure and signaling this value to the driver, calculating a value that represents vehicle speed and signaling this value to the driver, and calculating a value that represents distance traveled by the vehicle and signaling this distance to the driver.

25 Claims, 2 Drawing Sheets

SYSTEM, METHOD AND APPARATUS FOR MONITORING TIRE INFLATION PRESSURE IN A VEHICLE TIRE AND WHEEL ASSEMBLY

This invention relates to the complex relationship between a vehicle's speed and the rotational speed of its tires, and to use of this relationship to fulfill existing needs for an improved speedometer, for an improved odometer, for determining and displaying tire inflation pressure during vehicle operation, and/or for warning the driver of the vehicle if a tire should become dangerously underinflated during operation.

BACKGROUND OF THE INVENTION

The functions of measuring and displaying vehicle speed, and measuring and displaying distance traveled, are now performed by well-known speedometer and odometer devices. These current devices have various shortcomings. For example, the odometer commonly consists of a series of drum-shaped dials appropriately geared together and driven by a flexible cable that is, in turn, driven by a pair of gears attached to the vehicle's drive train or driven by one of the vehicle's wheels. Operation is based upon the fact that the wheels nominally make a specific determinable number of revolutions per mile traveled and the drive train, being geared to the driving wheels, also makes a determinable number of revolutions per mile traveled. The odometer essentially counts wheel revolutions and, by means of gear ratios, converts wheel revolutions to distance traveled.

An inherent error arises from the fact that the gears used to connect the odometer drive cable to the vehicle's drive train must have an integral number of teeth. That is, gears cannot have fractional teeth, and for practical purposes the number of teeth on at least one of these gears is usually small. Thus, only a finite relatively small number of ratios is available, and it is rarely possible to match the gear ratio exactly to the odometer's requirement. A matching error of up to plus or minus four percent is considered acceptable under current practice. Further inaccuracies arise from the fact that normal variations in tire size, construction, materials, aging, inflation pressure, temperature, rotational speed, wear, load and tire-to-road interactions cause the actual number of revolutions a tire makes per mile traveled to vary from the nominal value. Greater accuracy and reduced mechanical complexity are needed.

The most common type of speedometer in current use utilizes a rotating magnet that is driven by the same flexible cable as the odometer, and that rotates inside a cup-shaped member made of a conductive material such as aluminum. Rotation of the magnet causes eddy currents in the conductive material which, in reacting with the magnet's rotating field, cause this member, which is rotatably mounted coaxially with the magnet, to try to rotate in the same direction as the magnet. However, rotation of the cup-shaped member is resisted by a spring, so that this member assumes an equilibrium position at which the force of the spring is balanced by the force of the reaction of the eddy current with the magnet's rotating field. Since the spring's rate is approximately linear and the eddy current reaction forces are approximately proportional to the magnet's rotational speed, which in turn is approximately proportional to vehicle speed, the rotational angle of the cup, measured from its neutral position, is approximately proportional to vehicle speed. A pointer attached to the cup member and rotating therewith points to numbers that are arranged on a dial to indicate this vehicle speed.

Since the speedometer is driven by the same cable as the odometer, it is subject to the same errors. However, by judicious placement of the numbers on the dial, the effects of gear ratio mismatch and variations in tire revolutions per mile at different speeds can be compensated. The other errors inherited from the odometer are not compensated, and the speedometer has three further sources of error of its own. First, both the speedometer spring, and the relationship between eddy current reaction force and the magnet's rotating speed, are slightly variable and nonlinear, making it impractical to achieve an accurate speed display over a wide range of speeds. Second, the mechanism is subject to hysteresis and backlash. Third, the output of the device is affected by temperature variations. Errors of three to four miles per hour due to the basic inaccuracy of the eddy current and spring mechanism, and of two to three miles per hour due to temperature variations, are considered acceptable. Another less common type of speedometer employs a small generator and an associated meter in place of the eddy current, spring and pointer arrangement, but this type suffers from the same error sources as the more common type speedometer. A more accurate and less complicated speedometer is therefore needed.

The functions of measuring and displaying tire inflation pressure during vehicle operation, and of warning the driver in the event of a dangerously underinflated tire, are not now performed by any existing device in widespread use on light vehicles. Several schemes have been developed for these purposes but, to date, all have been comparatively complex and expensive and, as a result, their use has been confined to specialized fields such as certain military vehicles. None has proved to be economical and reliable enough for widespread use on passenger cars and light trucks. However, these light vehicles do have need for such a system for two principal reasons. First, it is not unusual for a driver to be unaware of an underinflated tire, and to continue to operate a vehicle with this condition. This can damage or destroy the tire or, more seriously, cause an accident due to the changed handling characteristics imparted to the vehicle by a dangerously underinflated tire.

Second, to save cost, space and weight, many of the automobile manufacturers wish to eliminate the spare tire from their light vehicles—i.e., passenger cars and light trucks. To accommodate this goal, several tire manufacturers have developed so-called run-flat tires that can operate for a limited time at a limited speed—for example 50 miles at 50 miles per hour—when completely deflated. In theory, the driver of the vehicle equipped with such tires would not be stranded by an underinflated or flat tire, but would be able to continue driving for a reasonable distance to reach a service station and have the condition corrected. Thus, such a vehicle would not require a spare tire. However, this has not worked out in practice because the driver often is not aware of the change when a tire on his vehicle loses pressure or goes flat. Consequently, he continues to drive, and the result may be even worse than with a normal tire. Not only is the tire damaged or destroyed, but the driver and his passengers, having no spare tire, may be stranded upon the final complete failure of the tire. Because of this, many automotive engineers have concluded that the key to eliminating the spare tire from light vehicles, even those equipped with run-flat tires, lies in monitoring tire pressure and signaling the driver when pressure is dangerously low.

An object of this invention is to provide an economical and reliable system, method and apparatus for measuring the inflation pressures of pneumatic tires while they are operating on a vehicle and for displaying these pressures to the operator of the vehicle. Another object of this invention is to provide an improved device for measuring and displaying vehicle speed. A further object of this invention is to provide an improved device for measuring and displaying distance traveled by a vehicle. Yet another object of the this invention is to provide an economical and reliable mechanism for warning the operator of the vehicle if the pressure of a tire on the vehicle should fall below a preset threshold value. A further object of this invention is to provide a system, method and apparatus for monitoring tire inflation pressure during operation, and for sending a warning signal if a tire's pressure should fall below a preset threshold value, which continues its monitoring function after sending the warning signal and, if such continued monitoring indicates that the pressure is actually not below the threshold value, cancels the warning signal and resumes normal operation. Another object of this invention is to provide a system, method and apparatus as described above that can be calibrated according to the characteristics of the specific vehicle and service for which it is intended, either before the vehicle is put into service or later during its service life, or both. Another object of this invention is to provide a device as described above that can make use of certain systems or subsystems that are already present on many vehicles.

BRIEF DESCRIPTION OF THE DRAWINGS

Further objects of this invention will become apparent from the following detailed description taken in conjunction with the accompanying drawings.

DETAILED DESCRIPTION OF PREFERRED EMBODIMENTS

Figure 1:
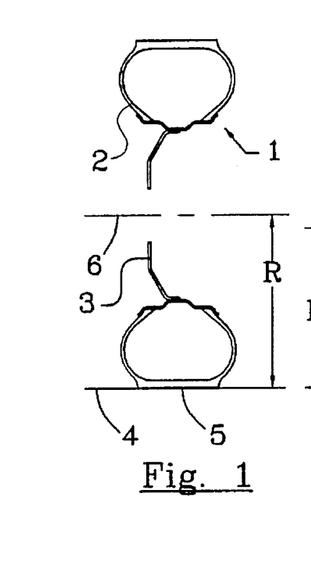
FIG. 1 is a sectional view through a pneumatic tire and wheel assembly, showing a normally inflated tire.

FIG. 1 shows a tire and wheel assembly 1 comprising a pneumatic tire 2 mounted on a wheel 3. The tire is inflated to its normal pressure and it contacts roadway or ground surface 4 at a contact patch 5. As the assembly rolls along surface 4, it rotates about its centerline 6 and its rolling radius is R, the perpendicular distance from centerline 6 to the effective center of contact patch 5. Thus, disregarding slip, during one revolution, the tire and wheel assembly, and the vehicle on which it is mounted, travel a distance equal to $2\pi(R)$, assuming that the distance traveled and the radius R are measured in the same units, for example inches, feet or meters.

Figure 2:
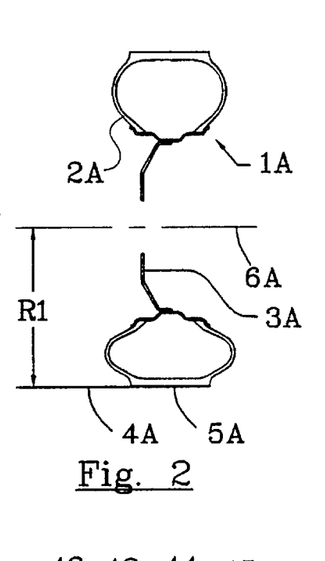
FIG. 2 is a sectional view through an identical tire and wheel assembly but showing the tire in an underinflated condition.

FIG. 2 shows tire and wheel assembly 1A, which is identical with the assembly in FIG. 1 except the tire 2A underinflated. Because the deflection of underinflated tire 2A, at its contact 5A with ground surface 4A, is greater than the deflection of normally inflated tire 2 (FIG. 1) at its contact 5 with ground surface 4, the rolling radius R1 of underinflated tire 2A (the perpendicular distance from centerline 6A to the effective center of patch 5A) is smaller than rolling radius R of normally inflated tire 2. Similarly, disregarding slip, for each revolution of tire 2A, the vehicle upon which it is mounted would travel a distance equal to $2\pi(R1)$. Since R1 is smaller than R, the distance traveled per revolution is proportionately smaller for underinflated tire 2A than for normally inflated tire 2.

FIGS. 1 and 2 are only illustrative and do not show all the complexities involved in determining rolling radius, or its inverse function, revolutions per mile, under dynamic conditions. However, they illustrate the fact that, in general, as a tire's inflation pressure decreases from its normal value, its rolling radius and, consequently, the distance it travels per revolution also decrease. Thus, at any given vehicle speed, a tire that is underinflated must rotate faster than it would if it were normally inflated. It follows that a device that can be designed to measure a tire's rotational speed under a particular set of circumstances and compare this speed with a reference or normal speed value for those circumstances will be able to infer the tire's inflation pressure, within the pressure range and limits of accuracy of the device.

In designing such a device, certain additional factors must be considered. For example, as mentioned above in the discussion of odometer accuracy, factors other than inflation pressure are known to affect tire rolling radius and revolutions per mile. Further, the relationship between inflation pressure and rolling radius or revolutions per mile is not linear and must usually be determined empirically. Nevertheless, a quantifiable relationship does exist, over a useful pressure range, between tire inflation pressure and rolling radius and revolutions per mile, and a functional system, method and apparatus for monitoring tire pressure, vehicle speed and/or distance traveled based on this relationship is achievable. The discussion below describes such an invention based upon the following ground rules and conventions: In normal service, tire and wheel assemblies such as illustrated in FIGS. 1 and 2 rotate as a unit, and the rotational speed of the tire is the same as and, for purposes of discussion and calculation, interchangeable with that of its respective wheel. Similarly, for each mile or kilometer traveled, a tire makes the same number of revolutions as does the wheel upon which it is mounted. As a practical matter, a tire's rolling radius is not easily measured under operating conditions, but its inverse function, the number of revolutions the tire makes per mile or kilometer, can be measured easily and accurately. For this reason, in the discussion and calculations herein, a tire's revolutions-per-mile value is often used in place of its rolling radius value.

The number of revolutions a tire makes per mile of operation is related in a predictable manner to a number of factors (tire size, type construction, materials used, cold inflation pressure, load carried per tire, speed, ambient temperature, etc.), and the effects of these relationships can be measured accurately, using readily available equipment, and tabulated into charts or performance maps. From these charts or performance maps, it is possible to determine, within the accuracy limits of the data and relationships tabulated, the value of an unknown variable, for example instantaneous tire pressure, if the contemporaneous values of the other tabulated variables, for example, tire size, construction, materials, cold inflation pressure, load carried by each tire, vehicle speed and ambient temperature are known.

Figure 3:
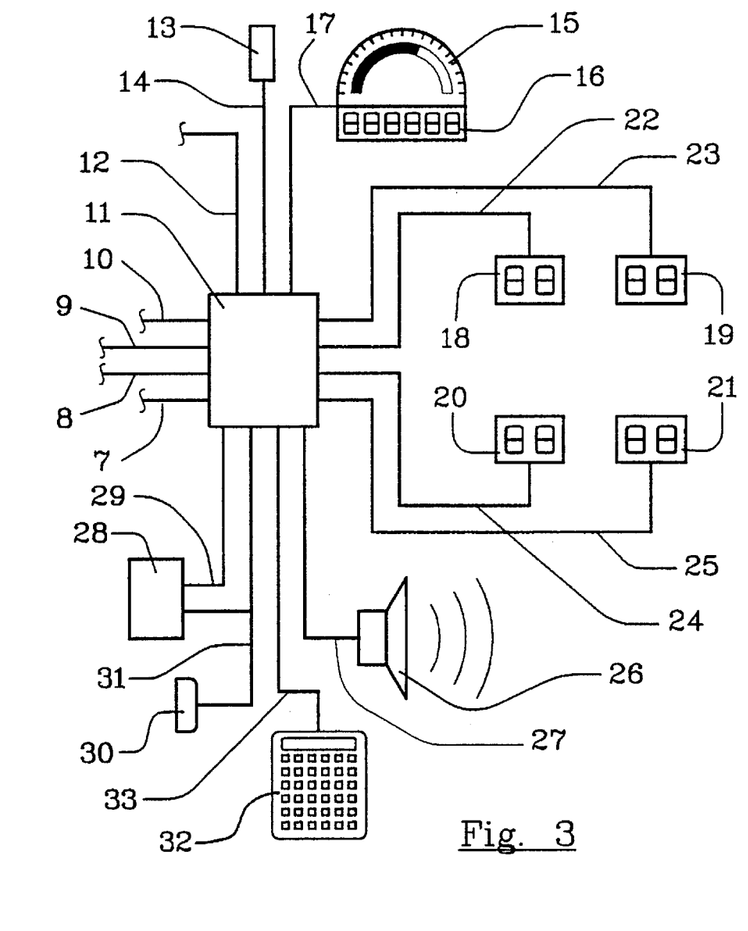
FIG. 3 is a generalized partial block diagram illustrating the principles of the present invention.
Figure 4:
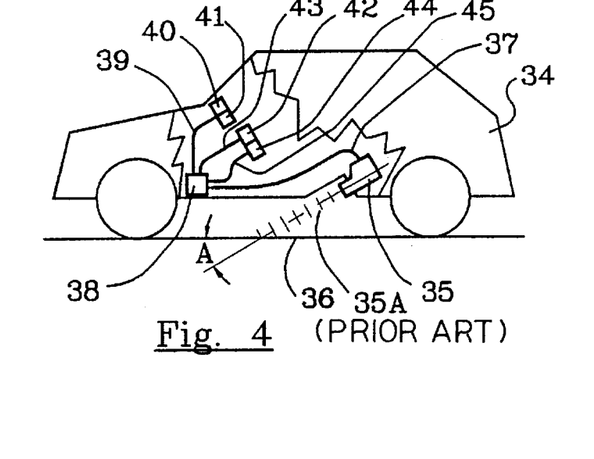
FIG. 4 is a schematic side elevation view, partly in section, of a vehicle having a direct reading ground speed and distance measuring means and a navigational means.

FIG. 3 is a partial block diagram of a pressure sensing and display system suitable for installation in a vehicle. Connections 7–10 are circuits, each of which carries a wheel rotational speed signal to a computer 11 from a wheel speed sensing unit (FIG. 6) associated with one of the four road wheels of the vehicle. Connection 12 is a circuit that carries a vehicle speed signal to computer 11 from the vehicle's speedometer, from a direct reading speed measuring system such as shown in FIG. 4, or from any suitable alternative device that measures the vehicle's speed. An electronic temperature sensing unit 13 is connected to computer 11 by a circuit 14. A speedometer display unit 15 is connected to computer 11 by a circuit 17. An odometer display unit 16 is also connected to computer 11 by circuit 17. Tire pressure display units 18–21, such as digital display or LCD units, are connected to computer 11 by circuits 22–25 respectively. An audible warning device 26 is connected to computer 11 by circuit 27. A non-volatile memory 28 is connected to computer 11 by circuit 29. An interface device 30 is connected by circuit 31 to computer 11 and memory 28. A computer programming device 32 is connected to computer 11 by circuit 33.

Figure 5:
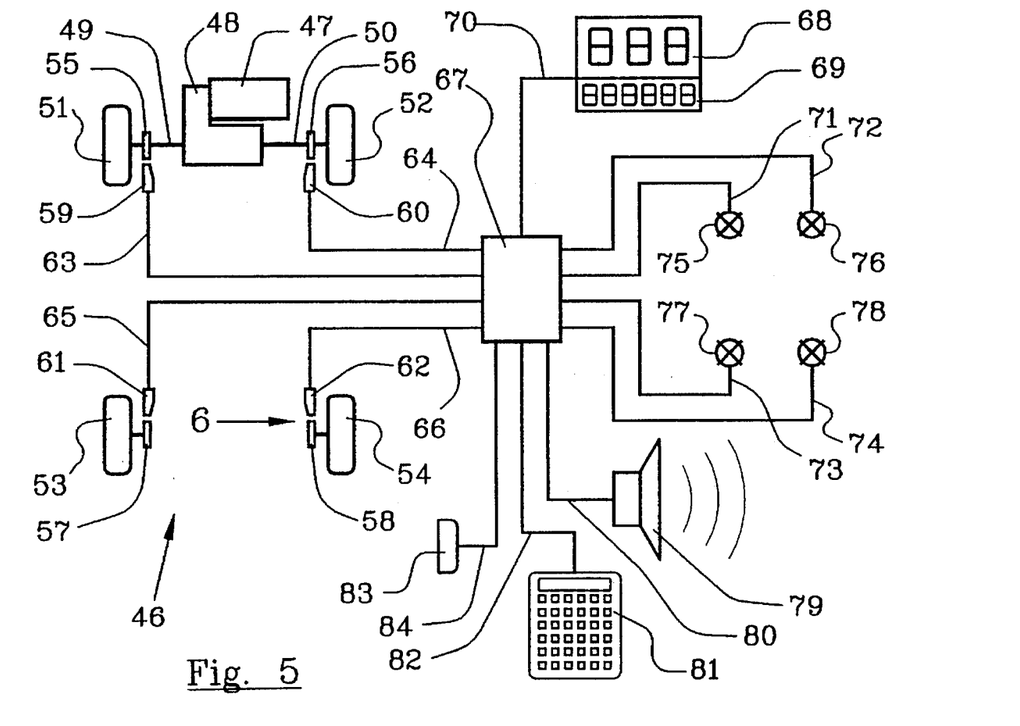
FIG. 5 is a schematic partial plan view of the running gear of a vehicle which incorporates elements of this invention. This figure also includes a specific version of the general diagram of FIG. 3.
Figure 7:
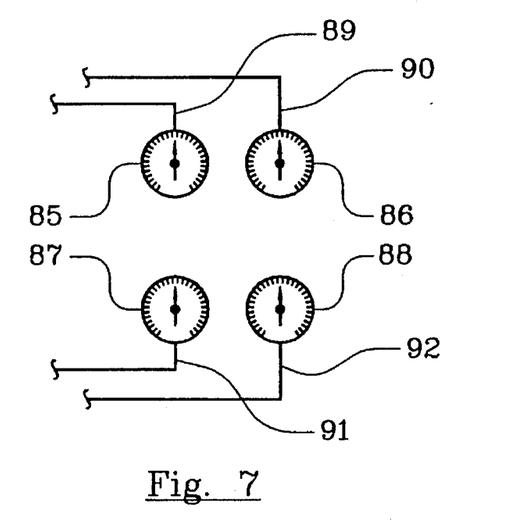
FIGS. 7 and 8 are schematic diagrams of display systems that can be used as alternatives to those shown in FIGS. 3 and 5.
Figure 8:
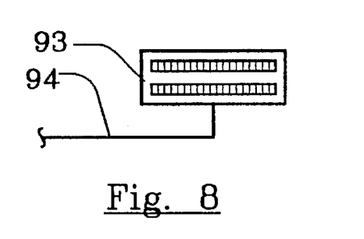

Computer 11 has amplifiers as required to activate output devices 15,16,18–21 and 26. Computer 11 or, another computer associated therewith, is also adapted to accept, convert and use different types of signals (digital, analog, etc.) from sensors connected to circuits 7–10 and 12. Also, although four circuits 7–10 are shown for four road wheel speed sensors, more or fewer such circuits and associated sensors are possible according to the number of wheels to be monitored. Additionally, according to the use to which the system is adapted, certain of the components shown in FIG. 3 may be optional or unneeded. For example, when the system is used only for low tire pressure warning, speedometer 15, odometer 16, memory 28, interface 30, programming device 32 and circuits 12,14,17,29,31 and 33 may be optional or unneeded. Digital pressure indicators 18–21 may be replaced by alternative analog, binary or digital indicators as shown in FIGS. 5,7,8, and the analog speedometer display 15 may be replaced by a digital one as shown in FIG. 5.

Non-volatile memory 28 contains a database that is essentially maps, tables or charts, as described above, showing relationships between tire inflation pressure and tire revolutions per mile at various speeds, ambient temperatures, cold tire inflation pressures and other operation conditions. Since these relationships are affected by many characteristics of the tire itself, for example, compounding of the elastomers used, tire size, aspect ratio, type of construction (number of plies, bias ply, belted, radial ply, run-flat, etc.), provision is made to replace or reprogram memory 28. Alternatively, data sets for a number of different types of tires are mapped into memory 28 and provision is made to instruct the computer, for example via programming device 32 and circuit 33, to use the appropriate data subset. In practice, a combination of these methods might be used.

In operation, the monitoring and displaying process is controlled by computer 11. The process operates in cycles and each cycle is initiated upon a signal from the computer's timing circuit. Upon a cycle start signal, computer 11 reads, via circuit 12, the vehicle speed signal from the vehicle speed measuring means, calculates vehicle speed in desired units, displays vehicle speed on speedometer 15, via circuit 17, then, based upon this speed and the time since the previous update cycle, calculates the distance traveled since the latest update and updates odometer display 16, also via circuit 17. The computer also reads, via circuit 14, the ambient temperature signal from sensor 13 and calculates ambient temperature in desired units. Computer 11 reads the wheel rotational speed signal on one of circuits 7–10, for example circuit 7 that carries the signal transmitted by one of the wheel sensor units, for example the one associated with the left front wheel, and calculates the speed of this wheel in desired units. With values for vehicle speed, ambient temperature and wheel speed determined, the computer searches the data in memory 28 for the tire inflation pressure corresponding to these values. It performs interpolations or manipulative calculations as necessary and displays the resultant tire pressure on a readout associated with the left front wheel, for example, indicator 18. Upon receiving the next cycle start signal, the computer repeats this process but substitutes the wheel speed signal of another wheel, for example, that from circuit 8, and displays the result on the readout corresponding to that wheel, for example, indicator 19. The computer continues thus, calculating and displaying the pressure of each tire in turn, until all have been completed, then returns to the first one and repeats the process continuously. It is to be understood that each computer cycle is relatively brief, and the display units 15,16 and 18–21 have sufficient persistence to avoid undesirable flicker or fluctuation between computer update cycles.

It is also to be recognized that certain transient variations in wheel speed, such as those caused by hitting a pothole, wheel hop on a rough surface, individual wheel spin or wheel lock conditions, rounding a corner, severe acceleration or braking, etc., could cause the computer to display an erroneous inflation value. To avoid this problem, the signal sent to the display unit is smoothed by any of several known methods, for example, discarding values which differ markedly from immediately preceding values, limiting the amount by which the displayed value can change from one cycle to the next, causing the displayed value to be an average determined over a number of calculation cycles etc. However, for reasons of accuracy and response time, it is sometimes desirable to limit the amount of smoothing or filtering of the displayed signal, even though such limiting might result in an occasional false low pressure warning being sent to the driver. To detect false warnings, the system continues to monitor wheel speed after a warning has been sent and, if subsequent values are acceptable, the warning signal is canceled and normal operation continues.

It is also recognized that nominal or cold tire inflation pressure variations can affect the in-service relationship between tire speed, vehicle speed and inflation pressure. Thus, for increased accuracy, cold tire inflation pressure may be input to the computer via programming device 32 and circuit 33 whenever the cold inflation pressure is changed. This causes the computer to search the data subset in memory 28 that is appropriate for this cold pressure when making its pressure determination. Of course, other inputs, in addition to vehicle speed, ambient temperature and cold tire pressure (for example, load carried by each road wheel) are possible further to improve the accuracy of the correlation upon which this invention is based, and the invention is not limited to these enumerated environmental inputs.

The system illustrated in FIG. 3 can operate without an external vehicle speed or distance signal input to circuit 12 because: (a) the rotational speeds of the individual road wheels of the vehicle are input to computer 11 via circuits 7–10, (b) the computer can access a wheel revolutions-permile database in memory 28, and (c) the computer incorporates an accurate clock. With information from the sources, the computer can calculate both vehicle speed and distance traveled. Such a speedometer and such an odometer offer advantages in accuracy, cost and durability in comparison with existing mechanical or electromechanical units. The cost and durability advantages arise from the elimination of the drive gears, drive cable, odometer counter mechanism, and speedometer eddy current and spring mechanisms in favor of simple electronic displays 15,16 and circuit 17 under the control of simple algorithms running on an existing computer 11. Accuracy advantages of the proposed speedometer and odometer, in comparison with conventional units, arise from three inherent differences from conventional units: first, the gear ratio mismatch errors of the conventional mechanically driven speedometer and odometer do not exist in the system of the present invention; second, errors caused by temperature variations, hysteresis, backlash, and eddy current and spring variables in conventional speedometers are absent in the disclosed system; third, the input values to the disclosed system are based upon empirical wheel revolution-per-mile data, which are more accurate than the generic values used in designing conventional odometers and speedometers. Furthermore, the proposed system can easily incorporate algorithms that determine which wheel speed signal or signals are most representative of true vehicle speed and base its calculations on these best values. For example, the computer might be programmed to ignore extreme values (such as might be caused by wheel-spin, wheel-lock or an underinflated tire), or it might be programmed to ignore any value that is erratic or varying rapidly, etc.

In addition to the above-noted benefits, more accurate odometers and speedometers offer the possibility of new vehicle features. For example, attempts have been made to achieve "dead reckoning" vehicle navigational and positioning systems, using as inputs only values of distance traveled, direction, etc. that are available from the vehicle itself. Such a system would be simpler than systems that determine vehicle position by triangulation of signals emitted by fixed broadcasting stations, for example, on satellites in space, but these self-contained systems require more accurate distance measurements than conventional odometer units can provide.

FIG. 4 shows a vehicle 34 equipped with a direct-reading speed and distance measuring device for a self-contained positioning and navigational system. A radar transceiver 35 emits a beam 35A, which impinges upon the roadway or ground 36 at angle A. Beam 35A is scattered, with part of the beam being reflected back to transceiver 35. Because of the well known Doppler effect, this reflected portion of the beam has an apparent difference in frequency from the emitted beam. Transceiver 35 captures this frequency data and sends it via circuit 37 to a computer 38, which calculates at frequent intervals the instantaneous speed of the vehicle and the distance traveled since the last update. This information is transmitted via circuit 39 to a speedometer display 40 and an odometer display 41. Computer 38 also reads directional data from a compass 44 via circuit 45 and, using this data plus the distance value it has just calculated, calculates a vector corresponding to the incremental movement of the vehicle since the last calculation cycle. The computer then adds this incremental vector to the sum of all the previous incremental vectors it has calculated since the navigational calculator was last reset, and determines the present location of the vehicle with respect to its location at the time of such reset. The computer then sends this location information via circuit 43 to a navigational display unit 42. In this manner, display 42 is continuously updated to show the vehicle's current position as it travels its course. This radar system has to date been too complicated and expensive for widespread use. The proposed system, as illustrated in FIGS. 3 and 5, offers a simpler and less expensive alternative for measuring distance.

FIG. 5 is a partial schematic diagram of a vehicle equipped with a version of the system illustrated in FIG. 3. The vehicle 46 is powered by an engine 47 driving a transmission/final-drive unit 48, axles 49,50, and tire and road wheel assemblies 51,52. Tire and road wheel assemblies 53,54 are not driven. Tire and road wheel assemblies 51–54 are similar to that shown in FIG. 1. A toothed ring 55–58 is affixed to each respective wheel assembly 51–54, and rotates unitarily and coaxially therewith. A sensing unit 59–62 is operably associated with each respective toothed ring 55–58 in a known manner so as to sense the rotating speed of the wheel assembly associated therewith. Each of the sensors 59–62 is connected to a computer 67 by means of one of the circuits 63–66. A speedometer display unit 68 and a odometer display unit 69 are connected to computer 67 by a circuit 70. Low pressure warning lights 75–78 are connected to computer 67 by circuits 71–74 respectively. An audible warning device 79 is connected to computer 67 by a circuit 80. A programming device 81 and an interface device 83 are connected to computer 67 by circuits 82 and 84 respectively. Computer 67 has amplifiers as required to power indicators 68,69,75–78 and audible device 79.

Figure 6:
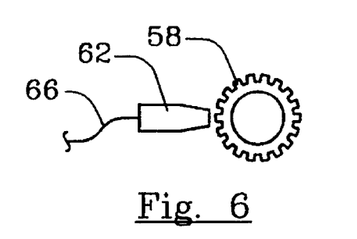
FIG. 6 is a view, looking in the direction of arrow 6 in FIG. 5, showing elements of a wheel speed sensor.

FIG. 6 is a view, looking in the direction of arrow 6 in FIG. 5, which shows the arrangement of toothed ring 58 and its associated sensor 62. The arrangement of the ring and sensor at each of the other road wheels is similar. These rings and sensors are of known type and, on some vehicles, they may be the same rings and sensors as used by an existing anti-lock brake system. Similarly, in FIG. 5, computer 67 and circuits 63–66 may, on some vehicles, be shared with the anti-lock brake system. FIGS. 7 and 8 show alternative displays that can be used in either of the systems shown in FIGS. 3 and 5. FIG. 7 shows analog indicators 85–88 and associated circuits 89–92 respectively, which may replace indicators 18–21 and circuits 22–25 in FIG. 3 or indicators 75–78 and circuits 71–74 in FIG. 5. FIG. 8 shows a unified display 93 and associated circuit 94, which may also replace display devices 18–21 and circuits 22–25 in FIG. 3 or displays 75–78 and circuits 71–74 in FIG. 5.

The system shown in FIG. 5 is less complex than that shown in FIG. 3. It does not display actual tire pressure, but it does monitor tire pressure and, if pressure drops below a predetermined threshold value, it turns on a light indicating which tire is low and also sounds an audible warning—the sound of a buzzer, beeper, chime, a simulated voice message or the like—to alert the driver to the problem. Additionally, the system calculates and displays vehicle speed and distance traveled more accurately than present speedometers and odometers do. In a simple embodiment of FIG. 5, which serves only as a low tire pressure warning system, vehicle 46 is equipped with tire and wheel assemblies 51–54, which are all of the same size and same type of construction so that, when properly and equally inflated, their rolling radii will be, for practical purposes equal—i.e. equal within the limits imposed by their manufacturing tolerances, load deflections, etc. Since their rolling radii are equal, all the tires will make the same number of revolutions for each mile the vehicle travels and, conversely, at any given vehicle speed, all the tires and wheels will have very nearly the same rotational speed. Disregarding transient conditions (wheel hop, wheel spin, brake lock-up, uneven traction conditions, etc.), the small differences in wheel speed that exist are due to different tire contact patch dynamics between driving and driven wheels, normal tire build tolerances and variations, load and speed variations, aging, wear, etc. For well built tires in good condition and operating under normal conditions, the cumulative effect of these conditions is small over a period of time, for example a 4% variation in the speed of one wheel from the average speed of the other wheels of the vehicle. However, if one of tires 51–54 should lose pressure, its rolling radius would decrease and its rotational speed with respect to the other tires would increase correspondingly. If the pressure loss were large, for example 60%, the decrease in rolling radius and the increase in relative rotational speed would also be large, for example 6%. This change, being significantly larger than the normal variations described above, may be set as a threshold value for triggering a low tire warning.

Under this embodiment, computer 67, in a known manner and at timed intervals, for example thirty times per second, reads the wheel speed signal from each sensor 59–62 associated with road wheels 51–54 respectively, calculates the average rotational speed of three of the wheels, for example 52–54, and compares this average to the rotational speed of the fourth or target wheel 51. If the speed of wheel 51 is less than 106% of the calculated average, no output signal results; but if the speed of wheel 51 is at least 106% of the calculated average for wheels 52–54, the computer determines that tire 51 is dangerously low and sends a signal to turn on warning light 75 associated with wheel 51, and causes device 79 to sound an audible alarm. At the next timed interval, the process is repeated, but the speed of another target wheel, for example wheel 52, is monitored and compared with the appropriate average, for example that of wheels 51,53–54. The process is repeated for the next target wheel, and the next, until all have been compared. Then the cycle begins again with the first target wheel and repeats continuously as long as the vehicle is in operation.

It should be noted that, in making this wheel speed comparison, the speed of the target wheel may be compared to values other than the average speed of the other three wheels. In fact there are advantages to introducing other values. For example, on two-wheel-drive vehicles, the tires of driving and non-driving wheels have different tire patch dynamics and slightly different rotational speeds, other factors being equal. In such vehicles, comparing the speed of a target wheel with that of the opposite wheel on the same axle (for example, comparing the speed of wheel 51 with that of wheel 52) eliminates these differences and permits a more discriminating determination. Also, when a vehicle rounds a corner, the outside wheels (those further from the center of curvature of the vehicle's path) travel further and rotate faster than the inside wheels. Comparing the speed of the monitored wheel with the speed of the other wheel on the same side of the vehicle (for example, comparing the speed of wheel 51 to that of wheel 53) reduces this difference. As a practical matter, these factors and others would be combined in devising an optimum low pressure warning algorithm for each type of vehicle and type of service. The output of computer 67 to signaling devices 75–78 and 79 is smoothed or filtered, as described previously, to reduce the number of false warnings due to transient conditions and, after triggering a low pressure warning, the computer continues to monitor the target wheel. If the warning proved to be false, the computer cancels it and resumes normal operation. In this simple embodiment of FIG. 5, speedometer 68, odometer 69, programming device 81, interface 83 and circuits 70,82 and 84 are not needed.

In a more elaborate embodiment of FIG. 5, the accuracy, discrimination and versatility of the system are improved by calibrating it for actual operating conditions. Calibration compensates for the effects of tire build tolerances and variations, the differences in speed between driving and non-driving wheels, tire speed differences due to differences in cold inflation pressure, tire size, type of construction etc. To effect this calibration, the actual service tires are mounted on the vehicle (they no longer need be all of the same type or size), each tire is inflated to its desired cold inflation pressure (the tires may now have different cold inflation pressures), and the vehicle is driven sufficiently to warm the tires to normal operating temperature. Then, as the vehicle is being driven in a normal manner over normal roads, computer 67 is instructed via programming device 81 and circuit 82 to execute a calibration routine that is stored in memory in the computer or in the programming device. Then, for a specified period, for example two miles, the computer at frequent intervals, for example ten times per second, monitors and records the speed of each of road wheels 51–54 via toothed rings 55–58, sensors 59–62 and circuits 63–66 respectively.

At the end of the monitoring and recording period, the computer calculates the average speed for each of the wheels and a reference value, for example the average speed for the four wheels. It then calculates for each wheel a calibration factor that, when multiplied by the average speed for the wheel in question, produces a value equal to the reference value. These calibration factors are then stored in non-volatile memory in the computer, each referenced to the appropriate wheel. This completes the calibration cycle and computer 65 returns to its normal mode. Now, however, when making the wheel speed comparisons as described above to determine if a low pressure warning should be triggered, the computer first multiplies each measured wheel speed value by its corresponding calibration factor. This eliminates several variables from the comparison and permits selection of a smaller threshold value for triggering a low pressure warning, for example, a 3% wheel-speed variation from the reference value. It should be noted that the computer 67 is able to perform these calibration measurements and calculations without interrupting its normal monitoring routines. Computer 67 can also be programmed to disregard questionable wheel speed values that appear to be due to transient or unusual conditions.

This calibration technique is adapted to more elaborate procedures when required for more demanding applications. For example, two calibration runs could be made in opposite directions over a controlled course. Runs could also be made at different prescribed speeds, ambient temperatures, wheel loads, etc. These more elaborate calibration procedures might result in a form of performance table or chart that would be mapped into non-volatile memory in computer 67, much as performance data was mapped into separate non-volatile memory 28 in the system shown in FIG. 3. In any event, provision is made to run the calibration routine not only when the vehicle is built but also as desired during its useful life, for example when one or more of the tires is replaced, when the stored compensation values are lost from the computer's memory, or when changes in the tires or in the vehicle's operating conditions warrant recalibration.

In another simple embodiment of FIG. 5, designed to perform only the speedometer function, the revolutions-per-mile characteristic of each size and type tire on the vehicle is determined under standard conditions and by standard means, usually by the tire manufacturer, and these values are entered into non-volatile memory in computer 67 by means of programming device 81 and circuit 82. It should be noted that these values are not derived by testing the specific tires mounted on the vehicle, but by testing other representative tires of the same size and type. Thus, they are generic values. In determining vehicle speed, computer 67 receives at frequent timed intervals (for example twenty times per second) signals for the speed or road wheels 51–54 via toothed wheels 55–58, sensors 59–62 and circuits 63–66 respectively, and based upon its stored values of revolutions-per-mile for the respective wheels, calculates a value for vehicle speed based upon the speed of each wheel. The computer then averages these individual vehicle speed values and sends this average value via circuit 70 to speedometer indicator 68. To achieve more accurate output when calculating these averages, the computer may be programmed to ignore instantaneous wheel speed values that appear to be invalid, such as those that are changing more rapidly than the others, those that differ significantly from the others, those that emanate from a wheel for which a low inflation pressure warning is in effect, etc. Also, the output speed signal from computer 67 to indicator 68 is smoothed or filtered somewhat as described earlier to avoid excessively rapid changes in the displayed speed.

Sensing and averaging the speeds of all the wheels is advantageous for speed calculations for certain types of vehicles, for example all-wheel-drive vehicles. However, vehicle speed calculation can be based on the speed of any wheel or any combination of wheels. For example, for the common type of vehicle having two driving and two non-driving wheels, there are advantages in sensing and using only the speed values of the non-driving wheels. This arises from two principal facts. First, the tire patch dynamics of driving wheels are affected by acceleration forces, and engine braking forces, and are thus more complicated than for non-driving wheels. These dynamics of acceleration and engine braking cause variations in the effective rolling radius and in the actual instantaneous revolutions-per-mile value of driving tires. Non-driving tires, not being subject to these forces, have a more consistent revolutions-per-mile value. Second, today's most common front-wheel-drive cars and light vans, under typical conditions, carry about 60% of their weight on their driving wheels and only about 40% on their non-driving wheels, which means that, for tires of equal capacity, the driving tires carry a specific load about 50% higher than the non-driving tires. This difference in specific loading is apparent in the inflation pressure vs. rolling radius relationship of the tires. The rolling radii, and thus revolutions-per-mile, of the non-driving tires are less affected by unintentional or intentional changes in inflation pressure. Thus, the wheel speed signals from non-driving wheels of typical front-wheel-drive cars and light vans have advantages of consistency and accuracy when used as the basis for vehicle speed calculations.

The speedometer according to FIG. 5 has advantages in accuracy compared to a conventional speedometer, as explained in the discussion of FIG. 3 above. Accuracy of the proposed speedometer may be enhanced, as also described above, by appropriate selection of the wheel or wheels to be monitored, by discriminating between valid and invalid signals from those wheels, etc. In a more elaborate embodiment of FIG. 5, speedometer accuracy is further enhanced by calibrating the system under actual vehicle operating conditions and with the actual service tires mounted on the vehicle. Speedometer calibration is similar to the low pressure warning system calibration routine described previously, and it compensates similarly for the effects of differences in cold inflation pressure, tire sizes, tire types, manufacturing variations, etc. However, during speedometer calibration, the vehicle's speed is measured by an independent master speedometer, for example a radar speed measuring device or, more commonly, a fifth wheel speedometer-odometer device. During calibration, the output of this master speedometer is input to computer 67 via auxiliary interface 83 and circuit 84. Then, with each tire inflated to its desired pressure and all tires warmed up to normal operating temperature, the vehicle is driven at various speeds, from the minimum to the maximum of the calibration speed range, over typical roads. At frequent timed intervals, the computer reads the rotational speed signal from each of the wheels chosen for speedometer input and reads the contemporaneous speed signal from the master speedometer via interface 83 and circuit 84.

Computer 67 then calculates, for each such wheel, an empirical revolutions-per-mile value which, when used with the observed wheel speed value to calculate vehicle speed, yields a value equal to the contemporaneous vehicle speed value determined by the master speedometer. The computer records each such calculated revolutions-per-mile value along with the contemporaneous vehicle speed value and continues this routine for a large number of cycles, for example for five miles. Then the computer sorts these recorded values into groups according to the speed to which they pertain, each group spanning a selected speed range, for example five miles per hour (i.e., one group might cover the range from 6 to 10 miles per hour, the next the range from 11 to 15 miles per hour, etc.). The computer then averages the empirical revolutions-per-mile values for each speed range for each wheel, stores these averages and their corresponding speed ranges in its non-volatile memory, and erases the values previously stored therein, if any. This completes the calibration process and subsequent speed calculations are based on these empirical revolutions-per-mile values, which are more accurate than the generic values described previously.

As before, the computer is able to perform this calibration routine without interrupting its normal monitoring function, and to disregard questionable values when recording data. This speed calibration process can be simplified by calculation of one average revolutions-per-mile value for the entire calibrated speed range. Conversely, it can be expanded to include multiple calibration cycles at different ambient temperatures, cold inflation pressures, tire loads, etc. so as to provide a more complete database or performance map of the revolutions-per-mile characteristics. When a more elaborate calibration routine is used, the computer is provided with sufficient non-volatile memory to contain the larger database. The computer is also equipped with input means to accept the necessary environmental inputs. For example, cold inflation pressure values are input via programming device 81 and circuit 82, while ambient temperature and load per wheel signals are input by means of interface 83 and circuit 84. The speedometer calibration routine may be performed when the vehicle is built and also whenever required during the service life of the vehicle. However, for calibration in the field, in the event that a master speedometer is not available, the routine may be altered so as to use a stop watch and measured course as the master speed measuring means.

The odometer function of the system of FIG. 5 is achieved in a manner similar to that of the speedometer function, the principal difference being that the algorithm used by the computer to calculate distance traveled is based on wheel speed, wheel revolutions per mile and the time between measuring cycles. Odometer calibration also differs from speedometer calibration in that empirical distance values are calculated rather than empirical speed values. Alternatively, if a system according to FIG. 5 is arranged to provide both a speedometer and an odometer readout, the computer is simply programmed to perform a mathematical time integration of the speed signals it calculates at timed intervals for the speedometer display, to accumulate these integrated values (which represent distance traveled), and to use this accumulated distance value to update the odometer at regular intervals.

For clarity, the various functions of the present invention have been described individually. However, in practice, any or all of these functions may be combined in a single system.

I claim:

1. A method of measuring inflation pressure of a pneumatic tire in a tire and wheel assembly on a vehicle comprising the steps of:
   (a) monitoring a rotational characteristic of the tire and wheel assembly,
   (b) monitoring at least one additional characteristic of the vehicle that is independent of rotational characteristics of any tire and wheel assemblies of the vehicle, and
   (c) indicating tire inflation pressure of the tire and wheel assembly monitored in said step (a) as a combined function of the characteristics monitored in steps (a) and (b),
   said step (c) of indicating inflation pressure comprising the steps of:
   (c1) obtaining, in a calibration mode of operation, data which relates rotational characteristics of the tire and wheel assembly monitored in step (a) to inflation pressure of such tire, and thereafter
   (c2) indicating inflation pressure of such tire as a combined function of characteristics monitored in steps (a) and (b), and calibration data obtained in said calibration mode of operation.

2. The method set forth in claim 1 wherein the calibration data obtained in said calibration mode of operation relates tire inflation pressure to rotational characteristics of said tire and wheel assembly and also to other operating characteristics.

3. A method set forth in claim 1 wherein said other operating characteristics include at least one of the characteristics of: tire size, tire type, load carried by a said road wheel, vehicle speed, ambient temperature, and cold tire inflation pressure.

4. The method set forth in claim 1 wherein said additional characteristic comprises a measure of vehicle speed independent of said tire and wheel assembly.

5. The method set forth in claim 4 wherein said measure of vehicle speed is obtained by a radar speed measuring device.

6. A method of measuring inflation pressure of a pneumatic tire of a tire and wheel assembly on a vehicle having multiple tire and wheel assemblies comprising the steps of:
   (a) monitoring a rotational characteristic of each tire and wheel assembly on said vehicle,
   (b) comparing the rotational characteristic of one tire and wheel assembly monitored in step (a) to a reference,
   (c) indicating tire inflation pressure of said one tire and wheel assembly as a function of a difference between its rotational characteristic and said reference, and
   (d) defining said reference as a function of the rotational characteristic of at least one of the other tire and wheel assemblies on said vehicle monitored in said step (a) and as a function of a measure of speed of said vehicle,
   said reference also including a table relating inflation pressure of said one tire and wheel assembly to the rotational characteristics of such tire and wheel assembly and vehicle speed, and wherein said step of comparing said rotational characteristic includes accessing said table as a function of such rotational characteristic and of said measure of vehicle speed.

7. A method of measuring the inflation pressure of a pneumatic tire of a tire and wheel assembly on a vehicle having multiple tire and wheel assemblies comprising the steps of:
   (a) monitoring a rotational characteristic of each tire and wheel assembly on said vehicle,
   (b) comparing the rotational characteristic of one tire and wheel assembly monitored in said step (a) to a reference,
   (c) indicating tire inflation pressure of said one tire and wheel assembly as a function of a difference between its rotational characteristic and said reference, and
   (d) defining said reference in part as a function of at least one of the rotational characteristics of the other tire and wheel assemblies monitored in said step (a) and in part independent of such rotational characteristics,
   said reference including a measure of the speed of said vehicle, and
   said reference also including a table relating inflation pressure of said one tire and wheel assembly to the rotational characteristics of such tire and wheel assembly and vehicle speed, and wherein said step of comparing said rotational characteristic includes accessing said table as a function of such rotational characteristics and of said measure of vehicle speed.

8. The method set forth in claim 1, 6 or 7 wherein said rotational characteristic comprises angular velocity.

9. The method set forth in claim 1, 6 or 7 wherein said step of indicating tire inflation pressure comprises the step of displaying tire inflation pressure to the vehicle operator.

10. The method set forth in claim 1, 6 or 7 wherein said step of indicating tire inflation pressure comprises the step of indicating to the vehicle operator when tire inflation pressure departs from a predetermined level.

11. The method set forth in claim 1, 6 or 7 wherein said step (c) comprises the steps of:
    (c1) actuating an alarm to warn a vehicle operator when tire inflation pressure drops below a preselected level,
    (c2) continuing to monitor said rotational characteristic and to determine tire inflation pressure, and
    (c3) terminating said step (c1) in the event that tire inflation pressure exceeds said preselected level.

12. The method set forth in claim 6 or 7 wherein said table is a combined table relating rotational characteristics of said assembly to speed of said vehicle and to one or more other operating characteristics of the vehicle, and wherein said step of comparing said rotational characteristic includes the steps of monitoring said other operating characteristics and of accessing said table as a combined function of said rotational characteristic, said vehicle speed and said other operating characteristics.

13. The method set forth in claim 12 wherein said other operating characteristics include at least one of the characteristics of: tire size, tire type, load carried by a said road wheel, vehicle speed, ambient temperature, and cold tire inflation pressure.

14. The method set forth in claim 6 or 7 wherein said step of indicating inflation pressure comprises the steps of:
    obtaining, in a calibration mode of operation, data which relates rotational characteristics of the tire and wheel assembly monitored in step (a) to inflation pressure of such tire, and thereafter indicating inflation pressure of such tire as a combined function of rotational characteristics monitored in step (a) and calibration data obtained in said calibration mode of operation.

15. A system for use on vehicles having road wheels with pneumatic tires, said system comprising:

a plurality of at least two sensing means, each such sensing means being associated with a vehicle road wheel, each such sensing means producing, as an output, a signal that is a measure of rotational speed of its respective road wheel, indicating means arranged to provide information to the driver of said vehicle, and computer means operably associated with said sensing means and said indicating means, said computer means being constructed to perform at least one of the functions of:

(a) selecting a wheel speed signal or signals to be used for determining inflation pressure of one of the tires of the vehicle, determining a value which represents the inflation pressure of such tire, and signaling at said indicating means when this value falls below a predetermined level, and (b) selecting a wheel speed signal or signals to be used for determining inflation pressure of one of the tires of the vehicle, determining a value which represents the inflation pressure of such tire, and signaling this value at said indicating means, wherein said computer means includes a database of values relating inflation pressures of the tires to rotational speeds of said road wheels and to the speed of said vehicle, and wherein this database is accessed in making the determinations specified in steps (a) and (b).

16. A system for use on vehicles having road wheels with pneumatic tires, said system comprising:

a plurality of at least two sensing means, each such sensing means being associated with a vehicle road wheel, each such sensing means producing, as an output, a signal that is a measure of rotational speed of its respective road wheel, indicating means arranged to provide information to the driver of said vehicle, computer means operably associated with said sensing means and said indicating means, and means for determining tire inflation pressure at said road wheels and inputting information indicative thereof into said computer means, said computer means being constructed to perform at least one of the functions of:

(a) selecting a wheel speed signal or signals to be used for vehicle speed determination, determining a value which represents the speed of the vehicle, and signaling this value at said indicating means, and (b) selecting a wheel speed signal or signals to be used for determination of distance traveled, determining a value which represents distance traveled by the vehicle, and signaling this distance at said indicating means, wherein said computer means includes a database of values relating inflation pressures of the tires to rotational speeds of said road wheels and to the speed of said vehicle, and wherein this database is accessed in making the determinations specified in steps (a) and (b).

17. A system for use on vehicles having road wheels with pneumatic tires, said system comprising:

a plurality of at least two sensing means, each such sensing means being associated with a vehicle road wheel, each such sensing means producing, as an output, a signal that is a measure of rotational speed of its respective road wheel, indicating means arranged to provide information to the driver of said vehicle, and computer means operably associated with said sensing means and said indicating means, said computer means being constructed to perform at least one of the functions of:

(a) determining a value which represents tire inflation pressure and signaling at said indicating means when this value falls below a predetermined level, and (b) determining a value which represents tire inflation pressure and signaling this value at said indicating means, and at least one of the additional functions of:

(c) determining a value which represents vehicle speed and signaling this value at said indicating means, and (d) determining a value which represents distance traveled by the vehicle and signaling this value at said indication means, wherein said computer means includes a database of values relating inflation pressures of the tires to rotational speeds of said road wheels and to the speed of said vehicle, and wherein this database is accessed in making the determinations specified in steps (a), (b), (c) and (d).

18. The system set forth in claim 15, 16 or 17 wherein said database relates said tire inflation pressures to said rotational speeds of said road wheels, to the speed of said vehicle, and to one or more other operating characteristics of the vehicle, and wherein said other operating characteristics are monitored by said system.

19. The system set forth in claim 18 wherein said other operating characteristics include at least one of the characteristics of: tire size, tire type, load carried by a said road wheel, vehicle speed, ambient temperature, and cold tire inflation pressure.

20. A system set forth in claim 15, 16 or 17 wherein the database not only contains a set of values for the road wheels and tires which are mounted on said vehicle, but also contains one or more other sets of values for alternative tires or wheels which may be mounted thereon, and wherein means are provided for instructing said system as to which set of values to access in making said determinations.

21. A system for use on vehicles having road wheels with pneumatic tires, said system comprising:

a plurality of at least two sensing means, each such sensing means being associated with a vehicle road wheel, each such sensing means producing, as an output, a signal that is a measure of rotational speed of its respective road wheel, indicating means arranged to provide information to the driver of said vehicle, and computer means operably associated with said sensing means and said indicating means, said computer means being constructed to perform at least one of the functions of:

(a) selecting a wheel speed signal or signals to be used for determining inflation pressure of one of the tires of the vehicle, determining a value which represents the inflation pressure of such tire, and signaling at said indicating means when this value falls below a predetermined level, and (b) selecting a wheel speed signal or signals to be used for determining inflation pressure of one of the tires of the vehicles, determining a value which representing the inflation pressure of such tire, and signaling this value at said indicating means, wherein said computer means is arranged to perform, from time to time, a routine wherein calibration data, relating the current inflation pressures of the specific tire and wheel assemblies currently mounted on the vehicle to the rotational speeds of said road wheels and to the speed of said vehicle, is calculated and is stored in the system, and wherein said determinations are thereafter computed as a function of the most recent calibration data.

22. A system for use on vehicles having road wheels with pneumatic tires, said system comprising:

a plurality of at least two sensing means, each such sensing means being associated with a vehicle road wheel, each such sensing means producing, as an output, a signal that is a measure of rotational speed of its respective road wheel, indicating means arranged to provide information to the driver of said vehicle, computer means operably associated with said sensing means and said indicating means, and means for determining current tire inflation pressure at said road wheels and inputting information indicative thereof into said computer means, said computer means being constructed to perform at least one of the functions of:

(a) selecting a wheel speed signal or signals to be used for vehicle speed determination, determining a value which represents the speed of the vehicle, and signaling this value at said indicating means, and (b) selecting a wheel speed signal or signals to be used for determination of distance traveled, determining a value which represents distance traveled by the vehicle, and signaling this distance at said indicating means, wherein said computer means is arranged to perform, from time to time, a routine wherein calibration data, relating the current inflation pressures of the specific tire and wheel assemblies currently mounted on the vehicle to the rotational speeds of said road wheels and to the speed of said vehicle, is calculated and is stored in the system, and wherein said determinations are thereafter computed as a function of the most recent calibration data.

23. A system for use on vehicles having road wheels with pneumatic tires, said system comprising:

a plurality of at least two sensing means, each such sensing means being associated with a vehicle road wheel, each such sensing means producing, as an output, a signal that is a measure of rotational speed of its respective road wheel, indicating means arranged to provide information to the driver of said vehicle, and computer means operably associated with said sensing means and said indicating means, said computer means being constructed to perform at least one of the functions of:

(a) determining a value which represents tire inflation pressure at at least one of said road wheels and signaling at said indicating means when this value falls below a predetermined level, and (b) determining a value which represents tire inflation pressure at at least one of said road wheels and signaling this value at said indicating means, and at least one of the additional functions of:

(c) determining a value which represents vehicle speed and signaling this value at said indicating means, and (d) determining a value which represents distance traveled by the vehicle and signaling this value at said indicating means, wherein said computer means is arranged to perform, form time to time, a routine wherein calibration data, relating the current inflation pressures of the specific tire and wheel assemblies currently mounted on the vehicle to the rotational speeds of said road wheels and to the speed of said vehicle, is calculated and is stored in the system, and wherein said determinations are thereafter computed as a function of the most recent calibration data.

24. A system set forth in claim 21, 22 or 23 wherein said calibration data relates tire inflation pressures to rotational speeds of said road wheels, to speed of said vehicle, and to other operating characteristics of the vehicle.

25. The system set forth in claim 24 wherein said other operating characteristics include at least one of the characteristics of: tire size, tire type, load carried by a said road wheel, vehicle speed, ambient temperature, and cold tire inflation pressure.

* * * * *